United States Patent [19]

Schmitt et al.

[11] 4,253,387
[45] Mar. 3, 1981

[54] TWINE ACTUATED CUTTER IN A ROTARY CROP BALER

[75] Inventors: Raymond F. Schmitt, Hesston; Melvin V. Gaeddert, Newton; Bobby D. McWhirt, Hesston, all of Kans.

[73] Assignee: Hesston Corporation, Hesston, Kans.

[21] Appl. No.: 54,459

[22] Filed: Jul. 3, 1979

[51] Int. Cl.³ .......................................... B65B 13/18
[52] U.S. Cl. .......................................... 100/5; 100/88
[58] Field of Search ............................ 100/5, 13, 88

[56] References Cited

U.S. PATENT DOCUMENTS

| | | | |
|---|---|---|---|
| 2,627,223 | 2/1953 | Berge | 100/88 X |
| 2,850,964 | 9/1958 | Harrer | 100/5 |
| 3,064,556 | 11/1962 | Luebben | 100/5 |
| 3,884,138 | 5/1975 | Rice | 100/5 |
| 3,894,484 | 7/1975 | Anstey | 100/5 |
| 3,913,473 | 10/1975 | Meiers | 100/5 |
| 3,988,977 | 11/1976 | Anderson | 100/5 |
| 4,024,804 | 5/1977 | Hanson | 100/5 |
| 4,062,279 | 12/1977 | Grube | 100/5 |
| 4,072,095 | 2/1978 | Campbell | 100/5 |
| 4,169,410 | 10/1979 | Richardson | 100/5 |

Primary Examiner—Billy J. Wilhite
Attorney, Agent, or Firm—Schmidt, Johnson, Hovey & Williams

[57] ABSTRACT

As the twine dispensing tube swingably approaches its home or standby position, the tube strikes one leg of an L-shaped, pivoting lever of the cutter to swing the opposite leg thereof up into edgewise engagement with the underside of the twine such that the latter is stretched between the raised leg and the end of the tube. A depending, swingable knife of the cutter which has been momentarily pushed by the tube out of its path of travel returns with its sharp edge engaging the twine stretch and depresses the latter out of a straight-line relationship between the tube and the raised leg of the lever such that, as the tension and stress in the moving twine stretch increase due to its deflected, serpentine condition around said knife edge and the lever and the opposite pulling forces exerted by the tube and the bale, the twine severs itself against the sharp edge of the knife.

14 Claims, 15 Drawing Figures

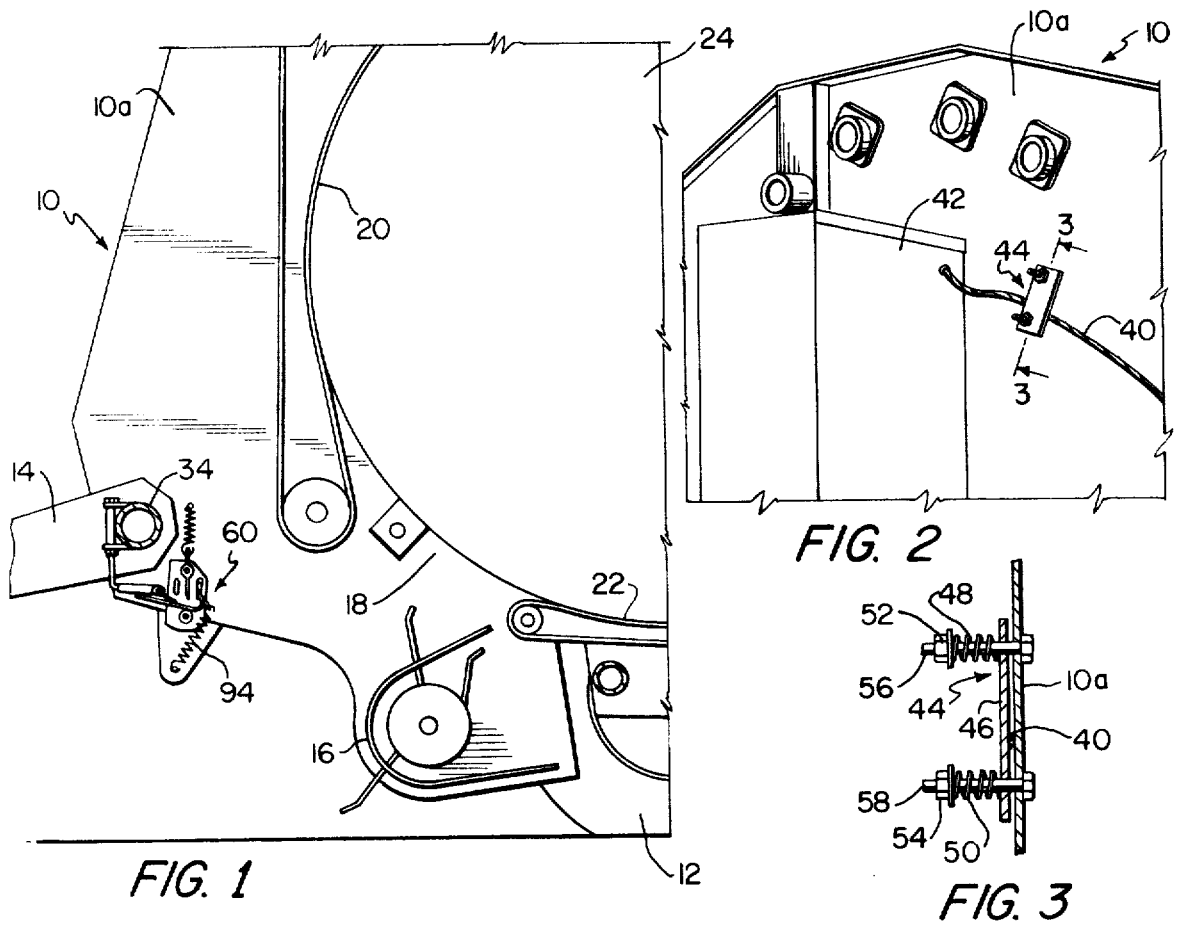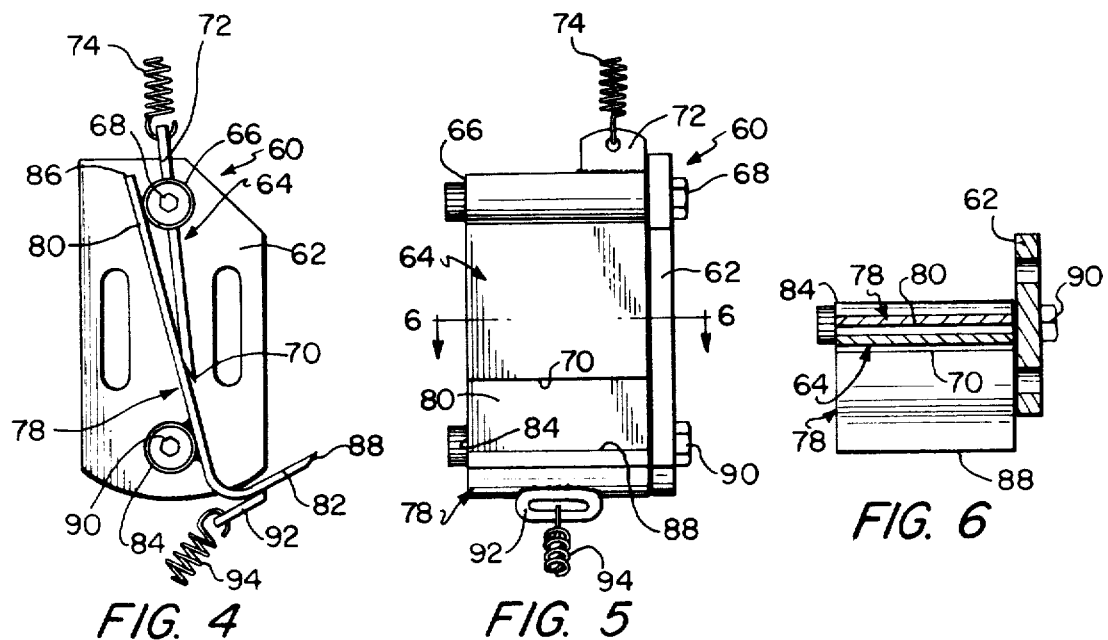

TWINE ACTUATED CUTTER IN A ROTARY CROP BALER

TECHNICAL FIELD

This invention relates to rotary balers and, more particularly, to wrapping mechanisms used in connection with winding or wrapping a suitable binding element such as twine helically around a bale after the latter has been formed within the chamber of the baler.

BACKGROUND ART

Various devices have heretofore been utilized in rotary balers for severing twine after the latter has been wrapped around a bale along the length thereof just prior to ejecting the bale from the baler. For a variety of reasons, however, numerous of these devices have been less than satisfactory. For example, stationary devices simply presenting one or more sharp edges have been utilized so that no moving parts requiring manual or automatic actuation and periodic servicing are involved. In balers employing such cutters the twine is simply drawn across the sharp edge of the cutter at the close of the bale-wrapping cycle with the hope that the tension in the twine will be sufficient to cause the twine to become severed as it is drawn across such knife edge.

It has been found in such stationary cutters, however, that there is little practical way of clearing trash and crop materials from the cutter which may accumulate during normal operating cycles of the baler and, as may be expected, such materials can and do interfer to a significant degree with the ability of the twine to come into proper severing engagement with the sharp edge of the cutter. When that occurs, the twine simply fails to sever and, if the operator notices the malfunction, he is then required to climb down out of the operator's position, walk to the baler, manually sever the twine and likewise manually clean out the cutter.

Other types of cutters have employed scissor-like components to snip the twine in two as the wrapping cycle is completed, but as in the case of the stationary cutters, it has not been unusual for such scissor-like cutters to become clogged with trash and other materials which require periodic cleanout in order to avoid malfunction. Moreover, scissor cutters are particularly dependent upon having a high degree of tension in the twine at the time of severance.

Desirably, the twine severance is carried out automatically so that the operator need not pay particular attention to the wrapping cycle per se and the position of the twine dispensing member relative to the end of the bale. Such automatic severance is quite old in the art such as shown, for example, in Berge U.S. Pat. No. 2,627,223; Harrer U.S. Pat. No. 2,850,964; and Luebben U.S. Pat. No. 3,064,556. There the cutter is actuated when the twine dispensing tube approaches its home position. However, one shortcoming with the approach of actuating the cutter according to twine tube position lies in the fact that the twine itself may not be perfectly oriented or properly tensioned at the particular instant that the dispensing tube triggers the cutter and, in that eventuality, the twine may fail to be severed.

SUMMARY OF THE PRESENT INVENTION

Accordingly, one important object of the present invention is to provide a cutter which requires no manual operation yet which is actuated by the twine itself reaching a certain degree of tension and stress as it engages a knife edge of the cutter so that it is the twine or other binding element itself that determines the precise instant of severance, taking into account all of the many variables involved, instead of the dispensing member being the controlling factor.

Pursuant to the foregoing, the present invention contemplates a cutter having two separately swingable parts, the lower part comprising a generally L-shaped lever pivoted intermediate its opposite ends to the interior wall of the baler adjacent the location where the twine tube comes to rest at its home or standby position. The lever is yieldably biased into a generally upright position in which the short leg thereof faces rearwardly toward the baling chamber and the long leg thereof extends generally upwardly toward the top of the baler. As the twine tube approaches home, it engages the long leg of the lever to rock the latter downwardly and the short leg upwardly so that the short leg engages the twine in the nature of a guide over which the twine must be drawn. In the standby or home position, the tube bears against the long leg of the lever so as to keep the latter in its rocked position.

Simultaneously with rocking the lever in this manner the tube also pushes a depending, swingable knife of the cutter upwardly out of the way as the tube approaches home. Once the tube has passed the knife, the latter swingably returns to its prior position and brings its lower knife edge into contacting engagement with the stretch of twine between the tube and the guide edge of the lever. The knife is of such length and is so positioned relative to the lever that the knife deflects the twine stretch downwardly out of its straight-line condition between the tube and the guide into a serpentine configuration as it bends around the knife edge and over the guide of the lower lever. As the spinning bale continues to pull on the twine and move it through the serpentine restriction formed by the knife edge and the guide against the resistance created by the restriction, the moving stretch progressively tightens against the knife edge until severing itself at its limit of resistance.

BRIEF DESCRIPTION OF THE DRAWINGS

FIG. 1 is a fragmentary, side elevational view of a baler incorporating a cutter in accordance with the principles of the present invention, the near sidewall of the baler being removed to reveal details of construction;

FIG. 2 is a fragmentary, front perspective view of an outside wall of the baler showing in particular a storage box for twine used in connection with the present invention, as well as showing a twine tensioning device for the twine;

FIG. 3 is an enlarged, fragmentary, cross-sectional view of the tensioning device taken substantially along line 3—3 of FIG. 2;

FIG. 4 is an enlarged, side elevational view of the cutter;

FIG. 5 is a rear elevational view thereof;

FIG. 6 is a cross-sectional view thereof taken substantially along line 6—6 of FIG. 5;

DETAILED DESCRIPTION

Figure 7:
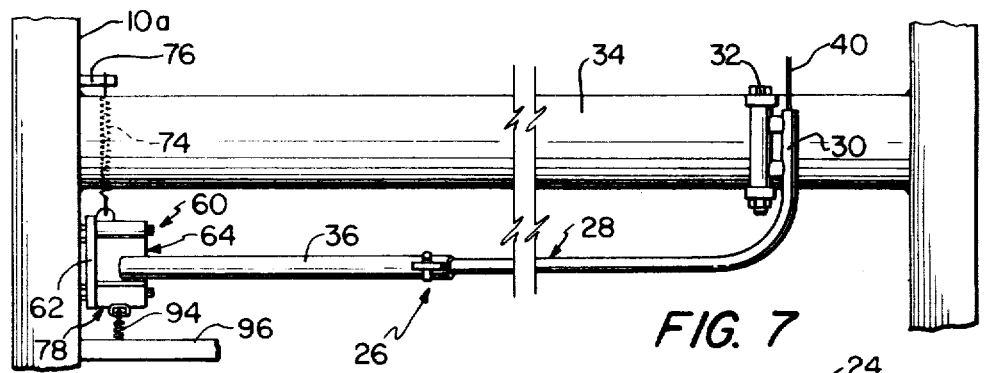
FIG. 7 is a fragmentary, front elevational view of the baler, the twine-dispensing tube and the cutter when the dispensing tube is in its standby or home position.

The baler 10 is provided with ground wheels 12 adapting the same for movement across a field, a fore-and-aft extending tongue 14 adapted at its forwardmost end for attachment to a towing vehicle (not shown), a pickup 16 for lifting windrowed crop materials off the ground as the baler 10 advances, and a bale chamber 18 disposed upwardly and rearwardly from the pickup 16 for receiving crop material from the latter. The chamber 18 is partially defined by belts 20 and 22 that cooperate to roll the incoming crop material into a bale until the latter reaches final size such as represented by the bale 24 in FIG. 1. When the bale 24 reaches its final size, advancement of the baler 10 is halted, but the belts 20,22 continue to be driven in direction that will cause bale 24 to continue spinning within the chamber 18 about the longitudinal axis of the cylindrical bale. At this time, a suitable wrapping element (herein illustrated and described as being twine although other suitable materials could likewise be utilized) is dispensed to the bale 24 progressively along the length thereof so that the bale 24 wraps itself with the element to preserve its integrity upon discharge from the baler 10. To this end, the baler 10 is provided with twine-dispensing mechanism broadly denoted by the numeral 26, said mechanism 26 including a generally L-shaped dispensing tube 28 having an upturned end 30 pivotally coupled via a pivot 32 to a transverse structural member 34 for swinging movement about the axis of the upright pivot 32. Although in practice a pair of such tubes 28 may be utilized, for clarity only a single tube 28 has been illustrated and will be described herein.

The tube 28 includes an outermost sleeve end 36 that is operably coupled with power apparatus for effecting swinging of the tube 28 about the pivot 32, said apparatus taking any suitable form. For example, a hydraulic piston and cylinder assembly 38 has been shown schematically in FIG. 8. The assembly 38 is operable to swing the tube 28 between its home or standby position as illustrated in FIGS. 1, 7, 9, 14 and 15, and a remote, operated position approximately 90° from the home position.

As illustrated in FIG. 2, twine 40 may be fed from a source of supply within a twine box 42 on the outside of the baler 10. The twine 40 passes through a suitable tensioning device 44 on its way to the tube 28, such tensioning device 44 being shown more completely in FIG. 3 as including a plate 46 biased by springs 48 and 50 toward the proximal sidewall 10a of the baler 10 so as to yieldably clamp the twine 40 against the sidewall 10a. The degree of clamping pressure applied by the springs 48,50 may be adjusted through nuts 52 and 54 threaded onto the outer ends of studs 56 and 58, such nuts 52,54 serving to trap the respective springs 48,50 in place about their corresponding studs 56,58 against the plate 46. The twine 40 enters the tube 28 via the upturned end 30 thereof and leaves the same via the sleeve end 36 thereof.

A cutter 60 is mounted on the inside surface of the sidewall 10a in a position slightly rearwardly of and slightly below the structural member 34. The cutter 60 includes a faceplate 62 rigidly secured by means not shown in a flat relationship against the sidewall 10a to provide supporting assistance for the remaining components of the cutter 60. A knife 64 in the form of a generally flat plate has a tubular boss 66 adjacent one end thereof which rotatably receives a pivot bolt 68 which in turn attaches the knife 64 to the faceplate 62 adjacent the upper region thereof. Bolt 68 adapts the knife 64 for depending, swinging movement about an axis disposed in transverse relationship to the path of travel of the baler 10 and likewise in transverse relationship to the path of travel of the tube 28 in the vicinity of the standby position of the latter. The lowermost edge of the knife 64 is sharpened so as to present a knife edge 70 extending parallel to the axis and swinging movement of the knife 64, and an upwardly projecting ear 72 on the boss 66 is adapted to receive one end of a tension spring 74 which extends in a generally vertical direction upwardly from the axis defined by the bolt 68 to be attached at its upper end to an inwardly projecting lug 76 on the sidewall 10a as illustrated in FIG. 7. Consequently, the spring 74 yieldably biases the knife 64 to an essentially vertically oriented position which is illustrated, for example, in FIG. 9 and which may hereinafter be referred to as the cutting position of the knife 64.

The cutter 60 also includes a second member or lever 78 of generally L-shaped configuration having a relatively long flat leg 80 and a relatively short upturned leg 82. The lever 78 has a tubular boss 84 affixed transversely to the backside thereof between the opposite ends 86 and 88, said boss 84 rotatably receiving a pivot bolt 90 attaching the lever 78 to the faceplate 62 for rocking movement about an axis transverse to the path of travel of the baler 10 and to the path of travel of the twine tube 28 as the latter moves in the vicinity of its home position. The pivot bolt 90 is substantially directly below the pivot bolt 68 for the knife 64 and is disposed in parallelism therewith.

The short leg 82 of lever 78 has a depending lug 92 to which is attached one end of a tension spring 94, the opposite end of the spring 94 being suitably secured to a transverse structural member 96 or the like of the baler 10 as illustrated in FIG. 7 such that the spring 94 yieldably biases the lever 78 in a clockwise direction viewing FIG. 4 to rock the long leg 80 upwardly toward the knife 64 and the short leg 82 downwardly away from the knife 64. The knife 64 and the lever 78 are disposed in vertical alignment with each other transversely of the baler 10, and the long leg 80 is of such length that it is disposed to engage the boss 66 associated with knife 64 when the lever 78 is rocked to the position of FIG. 4, the boss 66 thereby serving as a limit stop for the biasing action of the spring 94 against the lever 78.

As illustrated herein, the end 88 of the lever 78 is preferably sharpened, although such is not an absolute requirement insofar as proper functioning of the cutter 60 is concerned. In this regard, as will hereinafter become apparent, the main role of the end 88 of lever 78 is to serve as a transverse guide across which the twine 40 is drawn during the cutting sequence, the primary severing action being obtained at the knife edge 70 of the knife 64. However, having the end 88 of lever 78 sharpened does provide a source of backup or auxiliary severing ability if, for any reason, such should become necessary during the twine-cutting sequence.

Figures 9, 10, 11, 12:
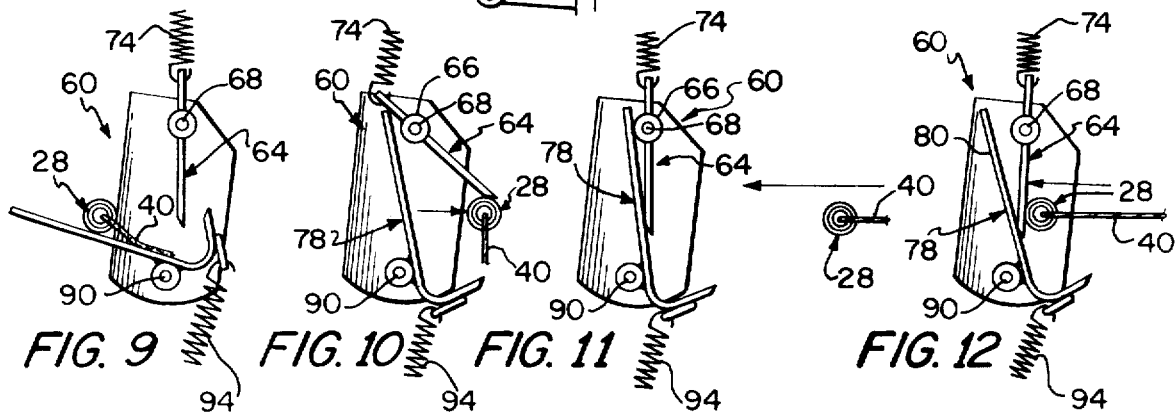
FIG. 9 is an illustration of the condition of the cutter when the dispensing tube is in its standby or home position prior to onset of the wrapping cycle.
FIG. 10 shows the twine tube leaving the cutter and its standby position as the wrapping cycle begins.
FIG. 11 shows the twine tube approaching the cutter and the standby position of the tube as the wrapping cycle nears completion.
FIG. 12 illustrates the twine tube as it makes initial engaging contact with the swingable knife of the cutter to move the knife out of the path of travel of the tube.

In use, the piston and cylinder assembly 38 maintains the twine tube 28 in its home or standby position of FIGS. 1, 7 and 9 throughout the time that the bale 24 is forming within the chamber 18. At such time, the condition of the knife 64 and lever 78 is as shown in FIG. 9 wherein the tube 28 is located forwardly beyond the depending knife 64 in the sense of the direction of travel of the baler 10 and maintains the lever 78 rocked to a position wherein the long leg 80 is almost horizontal, and the upturned, short leg 82 is slightly past vertical. The knife 64 hangs essentially vertically at this time, aided by the spring 74. A portion of the twine 40 dangles from the end of the tube 28 from the previous wrapping and cutting cycles.

Upon actuation of the piston and cylinder assembly 38, the twine tube 28 swings rearwardly into engagement with the front side of the knife 64 as shown in FIG. 10 and deflects the knife 64 out of the way. Such movement of the tube 28 permits the spring 94 to rock the lever 78 in a clockwise direction from its FIG. 9 position until the long leg 80 abuts the stop defined by the boss 66 associated with the knife 64. Further rearward movement of the twine tube 28 causes the latter to clear the knife 64 and permit the latter to swing back to its vertically depending position as illustrated in FIG. 11, for example.

Figure 8:
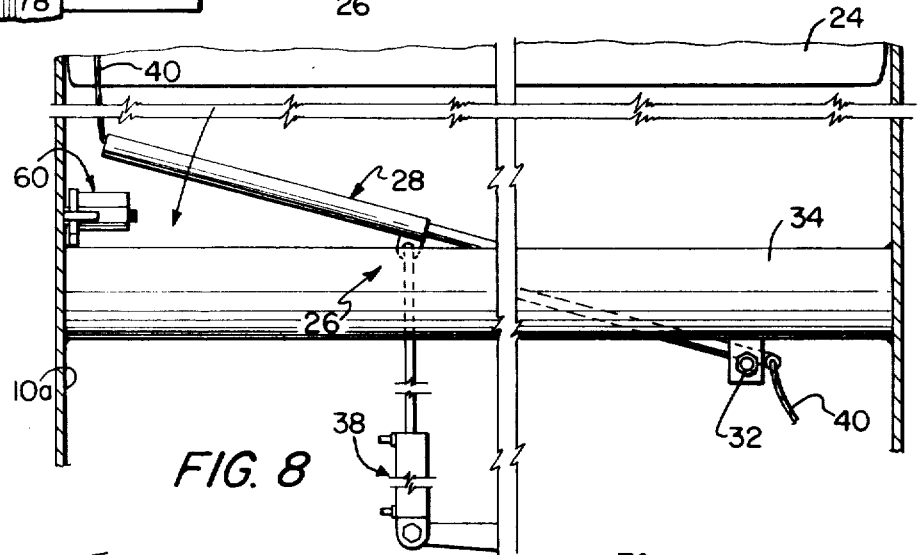
FIG. 8 is a fragmentary, top plan view of the baler, dispensing tube and cutter showing the tube approaching its home position and the cutter near the end of the wrapping sequence.

When the twine tube 28 has swung sufficiently far rearwardly for the dangling twine 40 to be caught up in new crop material being delivered to the chamber 18 by the pickup 16, the twine 40 will commence wrapping around the bale 24 as the tube 28 continues to be swung essentially along the length of the bale 24 toward an extreme remote position approximately 90° from that shown in FIG. 8. The operator will normally terminate further advancement of the baler 10 at this time such that no new material is picked up, although the belts 20,22 continue to be operated so that the bale 24 continues to spin within the chamber 18, the twine 40 thereby being coiled helically around and along the length of the bale 24 as the tube 28 swings back and forth between its two extreme positions.

FIG. 11 shows the twine tube 28 returning home toward the cutter 60 near the end of the wrapping cycle. As the tube 28 then makes contacting engagement with the depending knife 64 as illustrated in FIG. 12, the tube 28 begins to swing and deflect the knife 64 out of its way so that the tube 28 can reach its home, standby position. Pressure is simultaneously transmitted to the long leg 80 of the lever 78 so as to likewise rock the latter in a counterclockwise direction to move it out of the way of the tube 28 as well.

Figure 13:
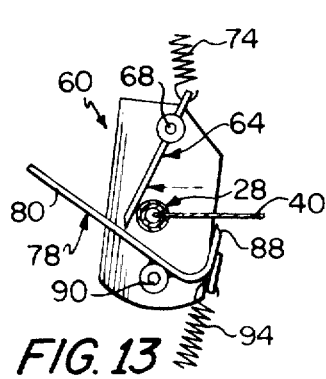
FIG. 13 illustrates a further step in the sequence as the tube pushes the knife out of the way and rocks the lower lever.

This action continues as illustrated in FIG. 13 as the tube 28 continues to approach its standby position and moves between the pivoting axes of the knife 64 and the lever 78. Finally, as shown in FIG. 14, the tube 28 reaches its standby position, at which point the tube 28 releases the knife 64 and bears directly against the leg 80 of lever 78 to rock the same to its counterclockwisemost position corresponding to that of FIG. 9.

Figure 14:
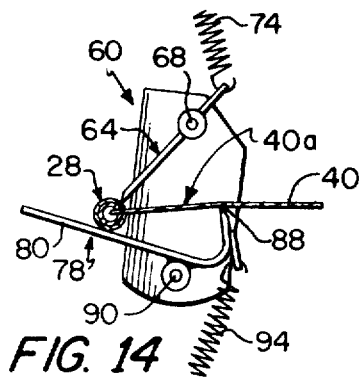
FIG. 14 shows the twine tube at the instant it reaches its home position and releases the knife, the short leg of the lever having been thrust upwardly against the twine at this time in the nature of a guide for the latter.

Note that by the time the tube 28 reaches the position of FIG. 14, the twine 40 has been drawn between the knife 64 and the lever 78 and across the guide defined by the end 88 of lever 78. A stretch 40a of the twine 40 is thus presented between the guide end 88 of the lever 78 and the tube 28 at this time, and it should be remembered that such stretch 40a is fairly taut because of the fact that the spinning bale 24 is pulling on one end of the twine 40 while the opposite end of the twine 40 is being resistively paid out by the tube 28 and the tensioning device 44 of FIGS. 2 and 3. The stretch 40a is also moving rather rapidly at this time in a linear sense rearwardly toward the bale 24.

Figure 15:
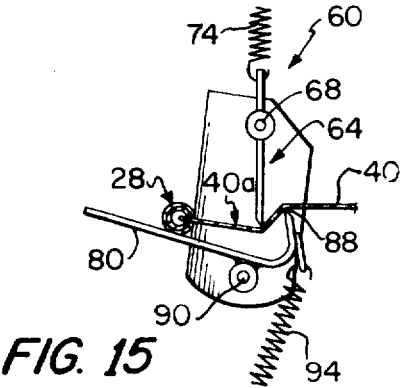
FIG. 15 shows the manner in which the knife returns to its initial depending position so as to deflect the stretch of twine between the tube and the guide of the lever in such a way that the twine will thereupon sever itself against the knife edge as the twine becomes increasingly serpentine and more taut.

Such linear movement of the twine 40, coupled with the force of gravity and the return spring 74, causes the knife 64 to be returned quickly back to its essentially vertical position of FIG. 15 as the knife edge 70 of knife 64 comes into contacting engagement with the stretch 40a. The distance from the pivot bolt 68 to the knife edge 70 exceeds the perpendicular distance between the bolt 68 and a straight line drawn between the tube 28 and the guide end 88 of lever 78 such that, as the knife 64 returns to its FIG. 15 position with the knife edge 70 engaging the stretch 40a, the latter is deflected and depressed downwardly toward the lever 78 and out of a straight-line configuration such that the edge 70 and guide end 88 cooperate to provide a serpentine restriction and resistance to further pay out of the twine 40 to bale 24. This places great stress upon the stretch 40a at the points where it moves across the edge 70 and the guide end 88. Continued linear movement of the twine 40 toward the bale 24 simply increases the intensity of the restrictive forces and the stress on the stretch 40a across these two strategic points as the twine stretch 40a drags the knife edge 70 closer and closer to guide end 88, until at a certain instant the serpentined stretch 40a can no longer withstand such forces and the twine 40 severs itself against the knife edge 70. It has been found that the knife 64 is normally rotated in a slightly more counterclockwise position from that illustrated in FIG. 15 at the precise moment of severance.

Upon severance the knife 64 returns to the extent necessary to its vertically depending position controlled by the spring 74 such as illustrated in FIG. 9 and the lever 78 remains in the position held by the tube 28 as also shown in that figure. The above-described cycle is then ready to be repeated after the next bale has been completely formed.

Hence, it will be seen that the twine 40 itself determines the precise point in time that severance will occur. Only after the moving twine 40 has pulled the knife 64 so far toward the guide end 88 that the stretch 40a is too severely crimped, tensioned and otherwise stressed to withstand the shearing action of the knife edge 70 will the twine 40 indeed be severed. Consequently, it will be recognized that the twine 40 itself does indeed actuate the cutter 60 to carry out the severance in contra distinction to prior devices wherein severance was totally controlled by the twine-dispensing tube and its position relative to other components of the baler.

Furthermore, it is noteworthy that any crop material which might tend to become accumulated on the lever 78 during the bale-forming cycle is dumped from the lever 78 at the beginning of the wrapping cycle as the lever 78 swings quickly upwardly to its FIG. 10 and FIG. 11 position. Even if a small amount of material should happen to accumulate on the lever 78 during the short interval that the bale is being wrapped, such accumulated material will pose no problem insofar as proper cutting action of the knife 64 is concerned because such material can only lie beneath the twine stretch 40a as the lever 78 rocks rearwardly to its positions of FIGS. 14 and 15. Consequently, the accumulated material is not between the stretch 40a and the knife edge 70 but rather is in a backing-up position on the far side of the stretch 40a to, if anything, actually assist in proper severance rather than detract therefrom.

We claim:

1. In combination with a rotary baler having a member that is operable to dispense a wrapping element to a spinning bale in the baler, said member shifting back and forth during said operation thereof between a standby position at one extreme and a remote position at the opposite extreme and dispensing the element to the bale during said shifting so as to wrap said element around and along the bale, a cutter for severing said element from a source of supply thereof upon return of said member to said standby position, said cutter comprising:

a knife having a cutting edge transverse to the element when the latter is in the cutter and moving toward the bale, said knife being mounted for engagement and swinging thereof by the member from a cutting position to a position permitting movement of the member therepast as the member approaches said standby position; and a transverse guide adapted to receive said element across the same when the member is in said standby position before severance of the element so as to present a stretch of the element spanning the distance between said guide and the member, said knife being movable relative to said guide during said swinging of the knife by the member and being disposed for actuation in a returning movement to said cutting position by engagement of the cutting edge with the moving stretch of the element upon release of the knife by the member, said moving stretch thereby causing said knife to depress the stretch and sever the element as the stretch becomes increasingly taut against said cutting edge.

2. In the combination as claimed in claim 1, wherein said guide is mounted for movement into and out of a disposition for receiving the element across the same, said guide having a portion thereof engageable with said member during the latter's shifting into and out of said standby position for controlling said movement of the guide.

3. In the combination as claimed in claim 2, wherein said guide is provided with means yieldably biasing the same out of said element-receiving disposition thereof, said member being disposed to move said guide into said disposition against the force of said yieldable means.

4. In the combination as claimed in claim 1, wherein said knife and said guide are mounted for swinging movement about respective transverse pivots relative to the path of travel of the member on opposite sides thereof, said member passing between said pivots during movement thereof into and out of said standby position and being operable during said passage between the pivots to swing the knife out of the path of travel of the member and to control swinging of said guide into and out of the disposition thereof in which it is adapted to receive the element.

5. In the combination as claimed in claim 4, wherein said guide comprises part of a generally L-shaped lever having said pivot thereof located between its opposite ends, said guide being disposed at one end of the lever, said lever having its opposite end adapted for engagement with and operation by said member to swing said guide into said element-receiving disposition thereof, said lever being provided with means yieldably biasing the same in a direction to dispose said guide out of said element-receiving disposition and to dispose said opposite end thereof into position for engagement with said member.

6. In the combination as claimed in claim 5, wherein said yieldable means comprises a spring.

7. In the combination as claimed in claim 5, wherein said lever is provided with a stop in the path of swinging movement thereof, said yieldable means biasing the lever toward said stop.

8. In the combination as claimed in claim 5, wherein said knife comprises a plate depending from said pivot of the knife and having said cutting edge located at the lowermost extremity of the plate.

9. In the combination as claimed in claim 8, wherein said plate is provided with spring means yieldably biasing the same toward said cutting position.

10. In the combination as claimed in claim 9, wherein said pivot of the plate has a stop associated therewith and disposed in the path of swinging movement of said opposite end of the lever, said yieldable means biasing said opposite end of the lever toward said stop.

11. In the combination as claimed in claim 1, wherein said guide is provided with a cutting edge.

12. In the combination as claimed in claim 1, wherein said knife is gravity-biased toward said cutting position.

13. In the combination as claimed in claim 12, wherein said knife is further provided with spring means yieldably biasing the knife toward said cutting position.

14. In the combination as claimed in claim 1, wherein said knife is provided with spring means yieldably biasing the knife toward said cutting position.

* * * * *